(12) United States Patent
Kishigami et al.

(10) Patent No.: US 8,248,182 B2
(45) Date of Patent: Aug. 21, 2012

(54) COMMUNICATION SYSTEM WITH FUNCTION OF PREVENTING SIGNAL REFLECTION AND NODE INCLUDED IN THE SAME

(75) Inventors: Tomohisa Kishigami, Oobu (JP); Aya Yoshimura, Kariya (JP)

(73) Assignee: Denso Corporation, Kariya (JP)

( * ) Notice: Subject to any disclaimer, the term of this patent is extended or adjusted under 35 U.S.C. 154(b) by 399 days.

(21) Appl. No.: 12/713,633

(22) Filed: Feb. 26, 2010

(65) Prior Publication Data

US 2010/0219904 A1    Sep. 2, 2010

(30) Foreign Application Priority Data

Feb. 27, 2009  (JP) .................................. 2009-046632

(51) Int. Cl.
*H03H 11/28*  (2006.01)
(52) U.S. Cl. ......................................... 333/32; 333/124
(58) Field of Classification Search ............... 333/22 R, 333/81 R, 32, 124, 100, 1; 327/308, 309; 326/30
See application file for complete search history.

(56) References Cited

U.S. PATENT DOCUMENTS

| 5,548,226 A | 8/1996 | Takekuma et al. |
| 2006/0066358 A1 | 3/2006 | Tamai |

FOREIGN PATENT DOCUMENTS

| JP | H07-202947 | 8/1995 |
| JP | 2006-101430 | 4/2006 |
| JP | 2006-237763 | 9/2006 |

*Primary Examiner* — Stephen Jones
(74) *Attorney, Agent, or Firm* — Nixon & Vanderhye PC (57) ABSTRACT

The communication system includes a trunk line constituted of first and second signal lines for transmitting differential signals, a plurality of branch lines each branching from the trunk line and connected with a node, and at least one reflection prevention circuit connected between the first and second signal lines. The reflection prevention circuit includes a rectifier circuit configured to inhibit a current from flowing between the first and second signal lines when a voltage between the differential signals is smaller than or equal to a predetermined voltage, and allow a current to flow between the first and second signal lines when the voltage between the differential signals is larger than the predetermined voltage, and a resistive element connected in series to the rectifier circuit between the first and second signal lines.

17 Claims, 7 Drawing Sheets

COMMUNICATION SYSTEM WITH FUNCTION OF PREVENTING SIGNAL REFLECTION AND NODE INCLUDED IN THE SAME

CROSS-REFERENCE TO RELATED APPLICATION

This application is related to Japanese Patent Application No. 2009-46632 filed on Feb. 27, 2009, the contents of which are hereby incorporated by reference.

BACKGROUND OF THE INVENTION

1. Field of the Invention

The present invention relates to a communication system and a node for the communication system, the communication system including a trunk line to transmit differential signals and branch lines each branching from the trunk line and connected with the node, the node being configured to perform communication with other nodes by the differential signals.

2. Description of Related Art

The number of ECUs (Electronic Control Units) mounted on a vehicle and the amount of data transmitted between the ECUs through a control system are increasing steadily with the controls performed in the vehicle becoming complicated and sophisticated. Accordingly, there is a growing demand for a high performance communication system.

There is known a vehicle-mounted communication system having a bus structure including a trunk line constituted of a pair of signal lines for transmitting differential signals, and a plurality of branch lines each branching from the trunk line and connected with an ECU. The differential signals have two signal levels, a dominant level and a recessive level, in order to transmit data as binary signals by associating the dominant level and a recessive level respectively with the logical value 0 and the logical value 1, for example.

Figure 10:
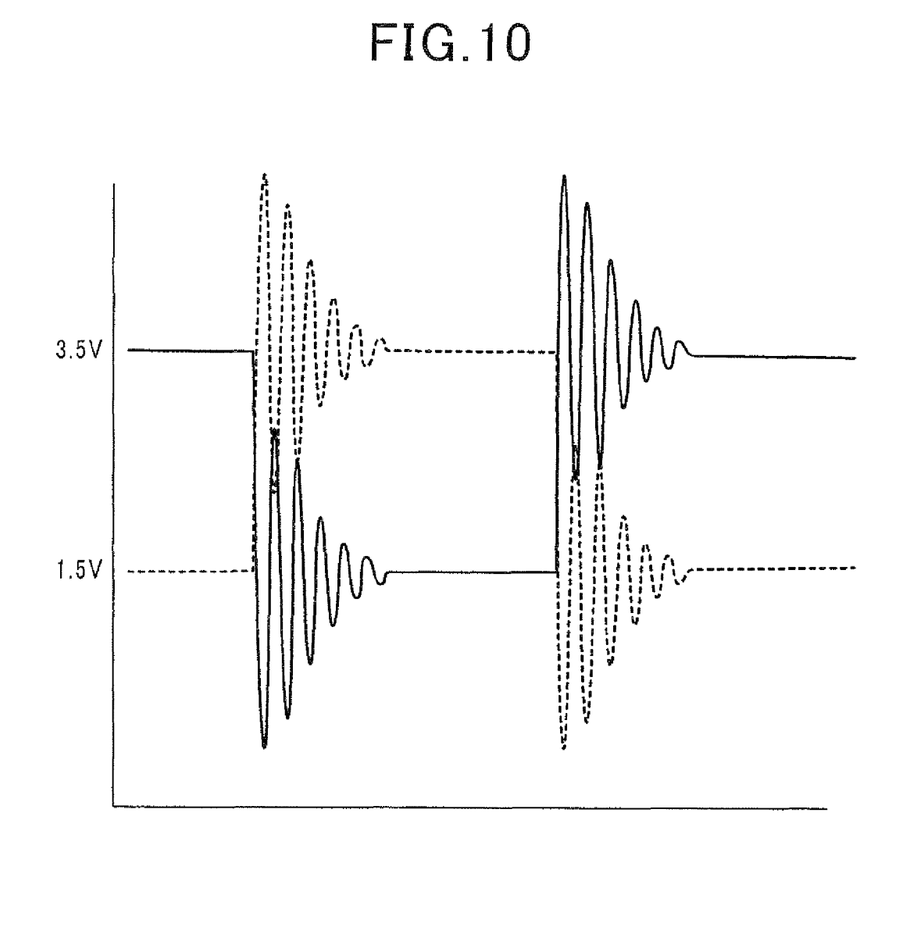
FIG. 10 is a diagram explaining problems of a conventional communication system.

However, such a communication system has a problem in that there occurs a signal reflection in the direction from the branch line to the trunk line at the branch point therebetween when the signal level is changed. The intensity of the signal reflection increases as the length of the branch line increases, and also as the communication speed of the communication system increases. When the signal reflection is excessively large, the differential signals are distorted to a large extent as shown in FIG. 10, causing communication accuracy to degrade, and also causing communication errors. The signal reflection occurs due to change of the characteristic impedance of the signal lines constituting the branch line caused when the length of the signal lines is changed, or when the number of the mounted ECUs is changed, for example. That is, the signal reflection occurs due to a characteristic impedance mismatch.

To solve this problem, it is known to insert a resistive element to each branch line for impedance matching to suppress reflection therefrom. For example, refer to Japanese Patent Application Laid-open No. 7-202947 or 2006-237763.

However, such a conventional technique has a problem in that signal amplitudes may be lowered to such an extent that the communication cannot be reliably performed depending on the inserting position of the resistive element. More specifically, in each of the communication systems disclosed in the above patent documents, since a resistive element is connected in series to the signal line, signal amplitudes are lowered considerably. Furthermore, in each of the communication systems disclosed in the above patent documents, since the resistive element has to be inserted into a connector in order to branch the branch line from the trunk line, there are disadvantages in manufacturing ease and cost. More specifically, since it is necessary to insert an additional circuit to the signal line, labor and cost to manufacture the communication system increase.

SUMMARY OF THE INVENTION

The present invention provides a communication system comprising:

a trunk line constituted of first and second signal lines for transmitting differential signals;

a plurality of branch lines each branching from the trunk line and connected with a node; and at least one reflection prevention circuit connected between the first and second signal lines;

wherein the reflection prevention circuit includes a rectifier circuit configured to inhibit a current from flowing between the first and second signal lines when a voltage between the differential signals is smaller than or equal to a predetermined voltage, and allow a current to flow between the first and second signal lines when the voltage between the differential signals is larger than the predetermined voltage, and a resistive element connected in series to the rectifier circuit between the first and second signal lines.

The present invention also provides a node of a communication system including a trunk line constituted of first and second signal lines for transmitting differential signals, and a plurality of branch lines each branching from the trunk line, the node being connected to each of the branch lines and including a reflection prevention circuit, the node comprising:

a rectifier circuit connected between the first and second signal lines and configured to inhibit a current from flowing between the first and second signal lines when a voltage between the differential signals is smaller than or equal to a predetermined voltage, and allow a current to flow between the first and second signal lines when the voltage between the differential signals is larger than the predetermined voltage; and a resistive element connected in series to the rectifier circuit between the first and second signal lines.

According to the present invention, it is possible to provide at low cost a communication system including trunk line constituted of first and second signal lines for transmitting differential signals, and a plurality of branch lines each branching from the trunk line and connected with a node, which can suppress signal reflections while keeping signal amplitudes at sufficient levels to perform communications among the nodes.

Other advantages and features of the invention will become apparent from the following description including the drawings and claims.

PREFERRED EMBODIMENTS OF THE INVENTION

First Embodiment

Figure 1:
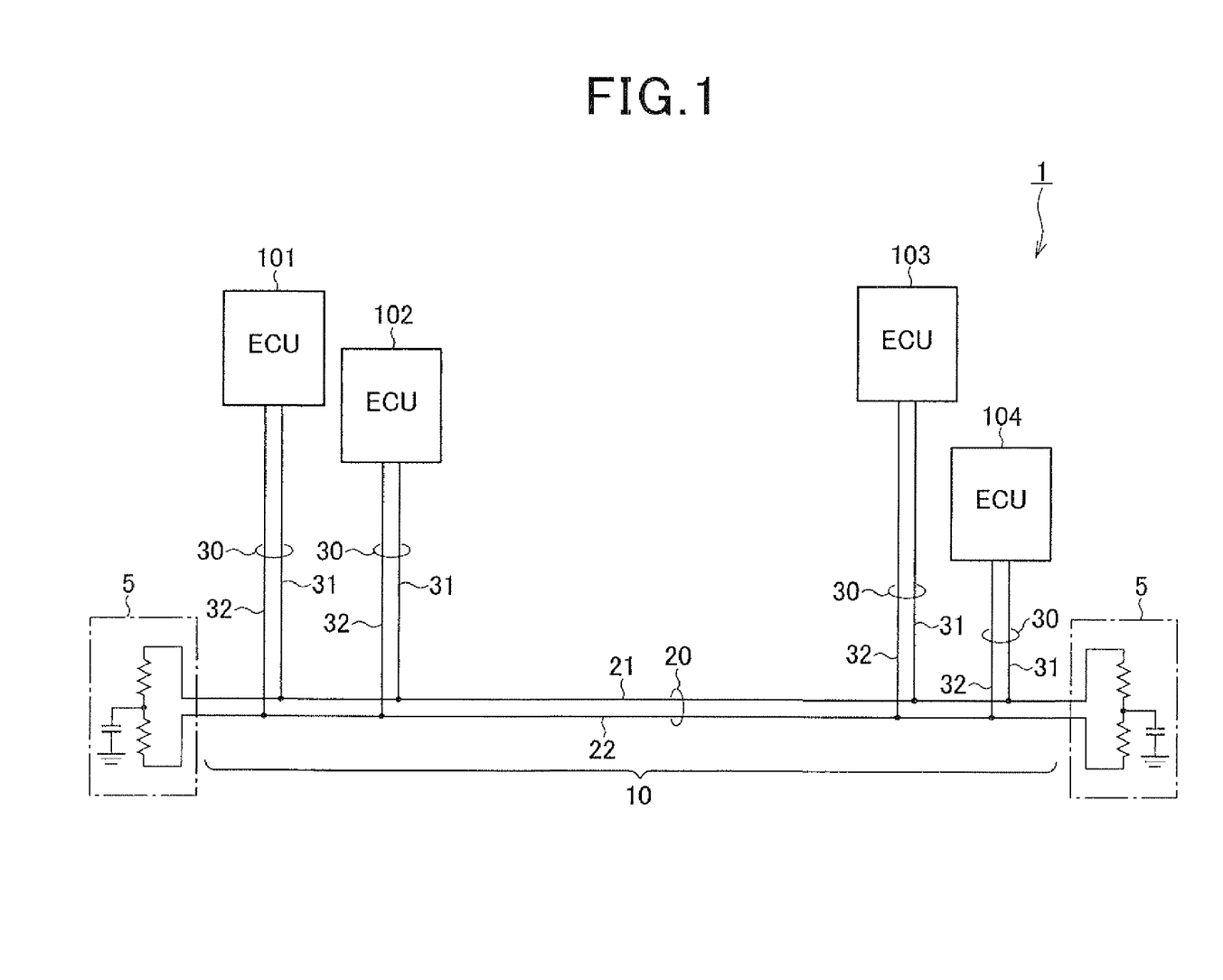
FIG. 1 is a diagram schematically showing the structure of a communication system 1 according to a first embodiment of the invention.

FIG. 1 is a diagram schematically showing the structure of a communication system 1 according to a first embodiment of the invention.

As shown in FIG. 1, the communication system 1 mounted on a vehicle has a structure in which ECUs 101, 102, 103 and 104 for controlling respective parts of the vehicle are connected to a bus 10.

The bus 10 is constituted of a trunk line 20 constituted of communication lines 21 and 22, and branch lines 30 each including communication lines 31 and 32 branching respectively from the communication lines 21 and 22. The ECUs 101 to 104 are connected to the branch lines 30 as nodes. The trunk line 20 is connected with a termination circuit 5 at its both ends (at both ends of the bus 10).

Each node delivers an inversion signal to the communication lines 31 and 32 to transmit data, and detects a voltage difference between the communication lines 31 and 32 as a signal level of the bus 10. The signal level of the bus 10 is either at a dominant level or at a recessive level. In the CAN (Controller Area Network), for example, when the signal level of the bus 10 (the voltage difference between the communication lines 31 and 32) is greater than 0.9 V, the bus 10 is determined to be at the dominant level. Generally, the dominant level corresponds to the logical value 0, and the recessive level corresponds to the logical value 1. In the above communication system 1, data transmission is performed in the form of binary signals representing the signal levels.

Figure 2:
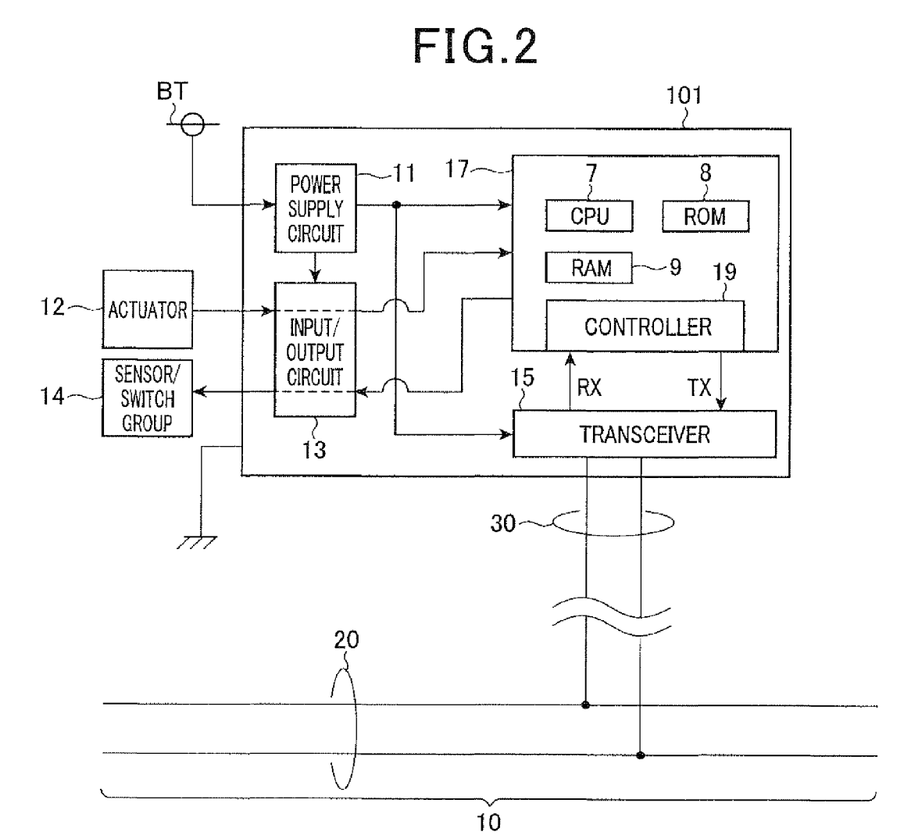
FIG. 2 is a diagram showing the structure of an ECU 101 included in the communication system 1.

FIG. 2 is a diagram showing the structure of the ECU 101. Other ECUs 102 to 104 have the similar structure as the ECU 101. The ECU 101 includes a microcomputer 17, a transceiver 15, an input/output circuit 13, and a power supply circuit 11. The microcomputer 17 performs processes necessary for control of respective parts of the vehicle and for communication with other ECUs 102 to 104. The transceiver 15, which is connected to the bus 10, delivers a transmission frame TX received from the microcomputer 17, and inputs data (a reception frame RX) on the bus 10 to the microcomputer 17. The input/output circuit 13 inputs signals received from an external sensor/switch group 12 to the microcomputer 17, and outputs signals received from the microcomputer 17 to an external actuator 14. The power supply circuit 11 supplies an operating voltage (5 V, for example) produced by stepping down an external battery voltage (12 V, for example) to the microcomputer 17, transceiver 15 and input/output circuit 13.

The microcomputer 7 includes a CPU17, a ROM 8, and a RAM 9. The microcomputer 7 further includes a controller 19 which performs a frame transmission/reception operation (an operation to transfer the transmission frame TX to the transceiver 15 and receive the reception frame RX from the transceiver 15), an arbitration control to determine which frame should be processed preferentially, a communication error process, etc.

The transceiver 15 controls the signal level of the bus 10 in accordance with data of the transmission frame TX, produces the reception frame RX constituted of binary signals of 0 or 1 as reception data on the basis of the signal level of the bus 10, and outputs the produced reception frame RX to the controller 19.

Figure 3:
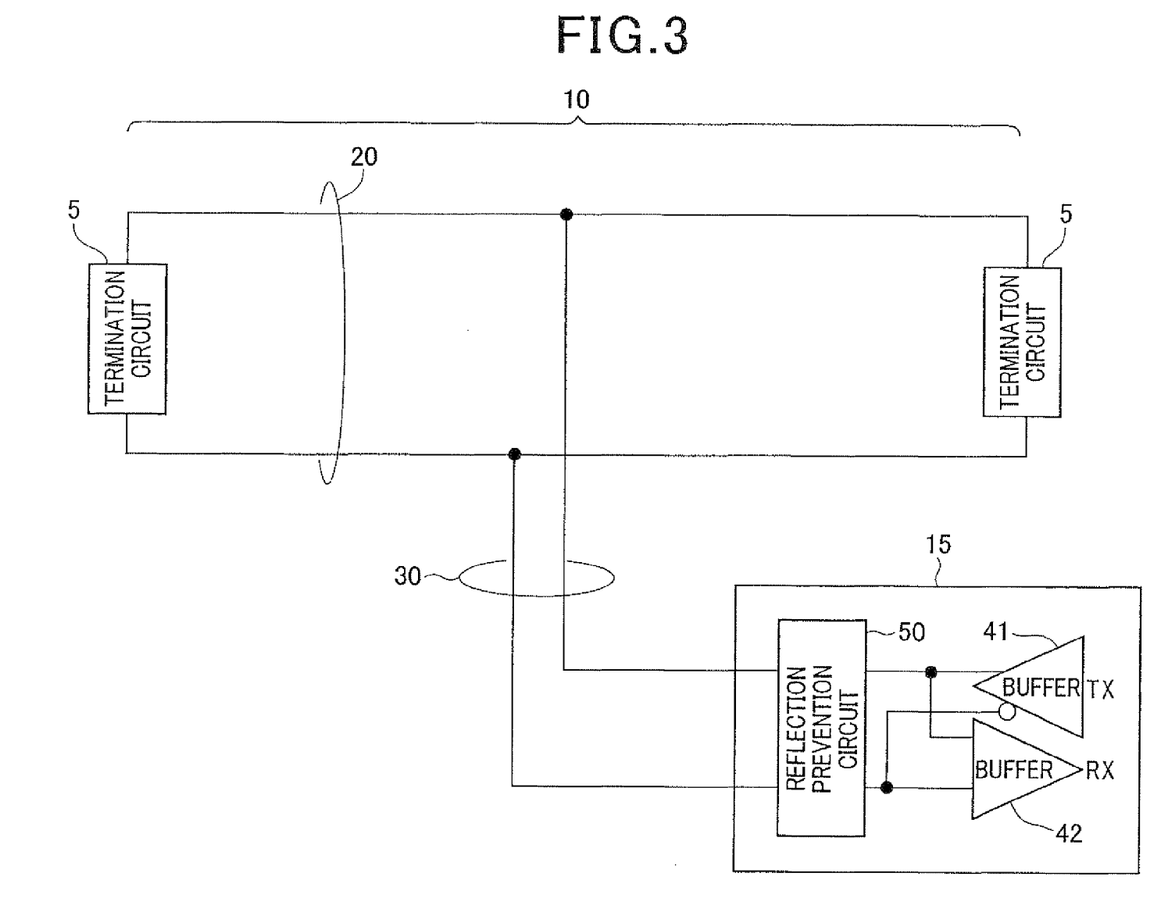
FIG. 3 is a diagram schematically showing the structure of a transceiver 15 included in the ECU 101.

FIG. 3 is a diagram schematically showing the structure of the transceiver 15. The transceiver 15 includes a transmission buffer 41 to deliver the transmission frame TX to the bus 10, and a reception buffer 42 to receive the reception frame RX from the bus 10.

Figure 4:
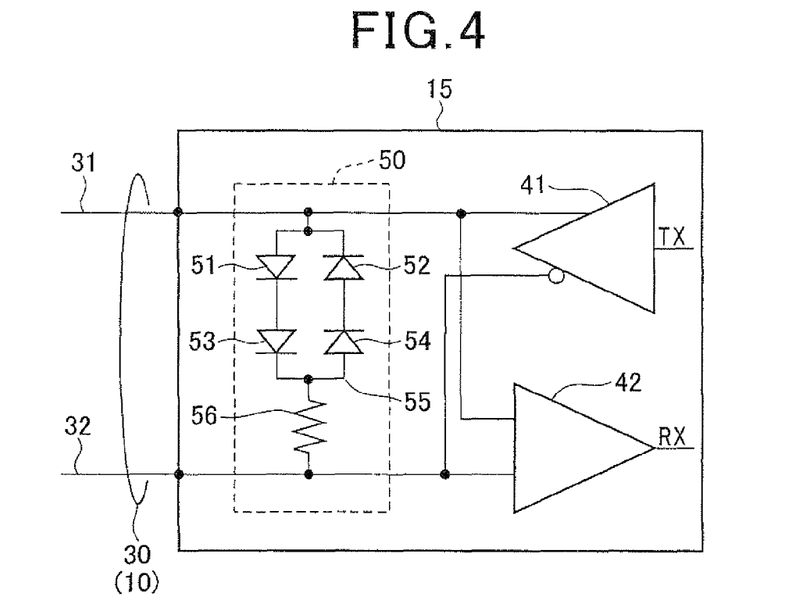
FIG. 4 is a diagram showing the structures of a reflection prevention circuit 50 included in the transceiver 15.

The transceiver 15 further includes a reflection prevention circuit 50. The reflection prevention circuit 50 is connected to the branch line 30 within the transceiver 15 (within the ECU 101). FIG. 4 is a diagram schematically showing the structure of the reflection prevention circuit 50 included in the transceiver 15.

The reflection prevention circuit 50 includes a rectifier circuit 55 and a resistive element 56 connected in series between the communication lines 31 and 32. The rectifier circuit 55 is constituted a series-connected pair of diodes 51 and 53 and a series-connected pair of diodes 52 and 54, these pairs being connected in parallel. The diodes 51 and 53 are connected in series such that their forward direction is from the communication line 31 to the communication line 32. The diodes 52 and 54 are connected in series such that their forward direction is from the communication line 32 to the communication line 31.

The impedance of the resistive element 56 is the same as the characteristic impedance of the bus 10. For example, in the case of CAN (Controller Area Network), it is common that the characteristic impedance of the bus 10 is 120Ω, and accordingly, a resistive element whose impedance is 120Ω is used as the resistive element 56.

Next, the operation of the communication system 1 having the above described structure is explained when the communication system 1 is a CAN network. In this case, the bus 10 is constituted of a CAN-H line (an H line) and a CAN-L line (an L line). Accordingly, when the communication lines 21 and 32 are H lines, the communication lines 22 and 32 are L lines. Here, it is assumed that the characteristic impedance of the bus 10 is 120Ω, and the impedance of the resistive element 56 is also 120Ω.

In the CAN network, to transmit data of 0, the H line is set to the high level (3.5 V, for example) and the L line is set to the low level (1.5 V, for example), and to transmit data of 1, the H line is set to the low level (2.5 V, for example) and the L line is set to the high level (2.5 V, for example). When the voltage difference between the H and L lines of the bus 10 (may be referred to as "differential potential of the bus 10" hereinafter) is greater than 0.9 V, the bus 10 is deemed to be at the dominant level, and when the differential potential is less than 0.5 V, the bus 10 is deemed to be at the recessive level.

In FIG. 4, when the sum of the forward voltage drops of the diode 51 and the diode 53 is 1.4 V, and the sum the forward voltage drops of the diode 52 and the diode 54 is also 1.4 V, no current flows through the reflection prevention circuit 50, and the impedance seen from the bus 10 is kept high until the voltage between the communication line 31 and 32 (the differential potential of the bus 10) reaches plus or minus 1.4 V. In this state, the transceiver 15 can receive signals stably at its reception buffer 42. In the CAN network, since data transmission can be performed within a range of the differential bus potential of +/−1.0 V, data transmission can be performed without hitch within this range because no current flows through the reflection prevention circuit 50.

On the other hand, in FIG. 4, if the differential potential of the bus 10 exceeds the range of +/−1.4 V, since a current starts to flow through the diodes 51 and 53, or through the diodes 52 and 54, the impedance seen from the bus 10 changes to 120Ω equal to the impedance of the resistive element 56. In this case, since this impedance coincides with the characteristic impedance of the bus 10, and accordingly impedance matching is achieved, signal reflection can be prevented or suppressed.

Figure 5:
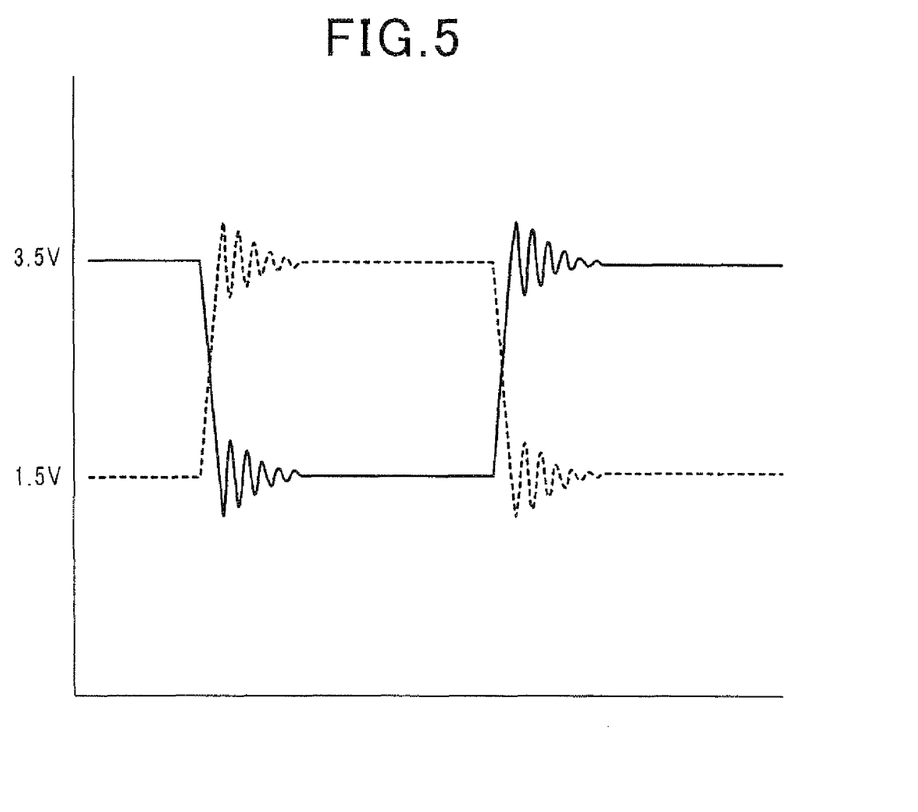
FIG. 5 is a diagram explaining advantages provided by the first embodiment of the invention.

As shown in FIG. 5, according to this embodiment, if the differential potential of the bus 10 increases excessively (if the voltage between the communication line 31 and 32 exceeds a target value of 3.5 V, or decreases below a target value of 1.5 V), the resultant signal reflection can be suppressed, and accordingly, the attenuation of the signal reflection can be accelerated compared to the conventional case shown in FIG. 10.

As explained above, according to this embodiment in which no current flows through the reflection prevention circuit 50 as long as the differential potential of the bus 10 is within the range required to perform communication, it is possible for each node to receive stable signals having magnitudes large enough to perform communication. Further, according to this embodiment, it is possible to suppress signal reflection when the differential potential of the bus 10 excessively increases, because a current flows thorough the reflection prevention circuit 50. Hence, according to this embodiment, it is possible to prevent ringing to occur to thereby improve communication accuracy. Incidentally, in this embodiment, although a signal reflection from the ECUs 101 to 104 as nodes can be suppressed, a signal reflection from the branch line itself occurs at the branch point between the branch line and the trunk line. However, even if a signal reflection occurs at the branch point, the resultant ringing can be attenuated rapidly, because the re-reflection from the node can be suppressed.

Second Embodiment

Next, a second embodiment of the invention is described with reference to FIGS. 6 and 7.

Figure 6:
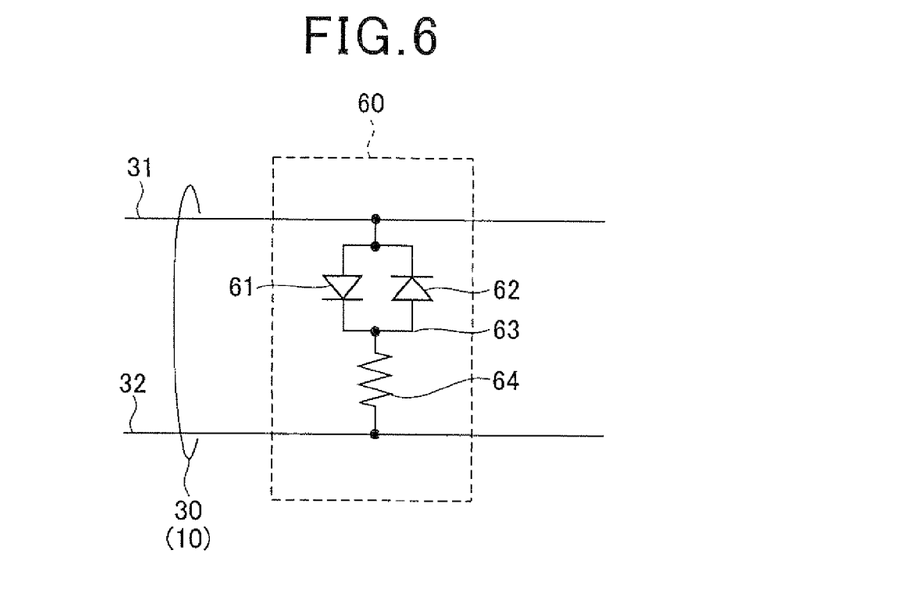
FIG. 6 is a diagram showing the structure of a reflection prevention circuit 60 of communication system of a second embodiment of the invention.
Figure 7:
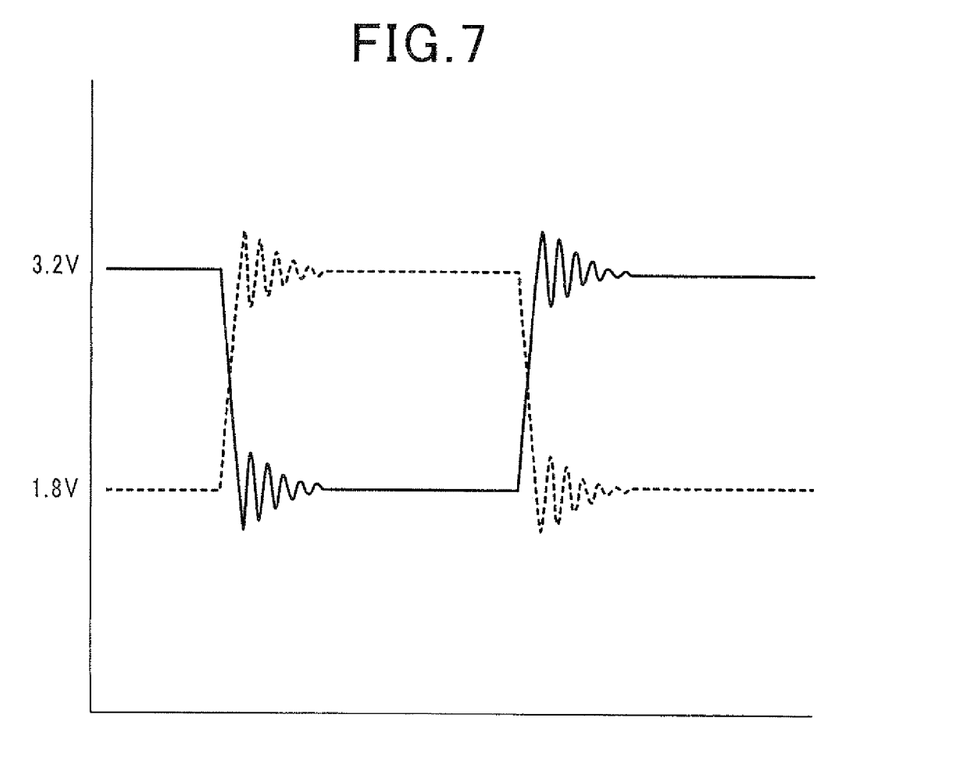
FIG. 7 is a diagram explaining advantages provided by the second embodiment of the invention.

The second embodiment differs from the first embodiment in that the second embodiment includes a reflection prevention circuit 60 shown in FIG. 6 instead of the reflection prevention circuit 50. Unlike the reflecting prevention circuit 50, the reflection prevention circuit 60 has only one forward diode.

As shown in FIG. 6, the reflection prevention circuit 60 includes a rectifier circuit 63 and a resistive element 64 connected in series between the communication lines 31 ad 32 constituting the branch line 30. The rectifier circuit 63 is constituted of a diode 61 and a diode 62 connected in parallel. The forward direction of the diode 61 is a direction from the communication line 31 to the communication line 32, while that of the diode 62 is a direction from the communication line 32 to the communication line 31.

The impedance of the resistive element 56 is equal to the characteristic impedance of the bus 10. Also by use of the reflection prevention circuit 60, the advantages as described in the first embodiment can be obtained.

Incidentally, the forward voltage drop in the second embodiment is smaller than that in the first embodiment, because the number of the diodes in the second embodiment is less compared to that in the first embodiment. Accordingly, in the second embodiment, the differential potential of the bus 10 when a currents starts to flow through the rectifier circuit 63 is small compared to the first embodiment. As shown in FIG. 7, when the differential potential of the bus 10 is higher than 3.2 V or lower than 1.8 V, a signal reflection can be suppressed since a currents flows through the reflection prevention circuit 60.

Third Embodiment

Next, a third embodiment of the invention is described with reference to FIGS. 8 and 9.

Figure 8:
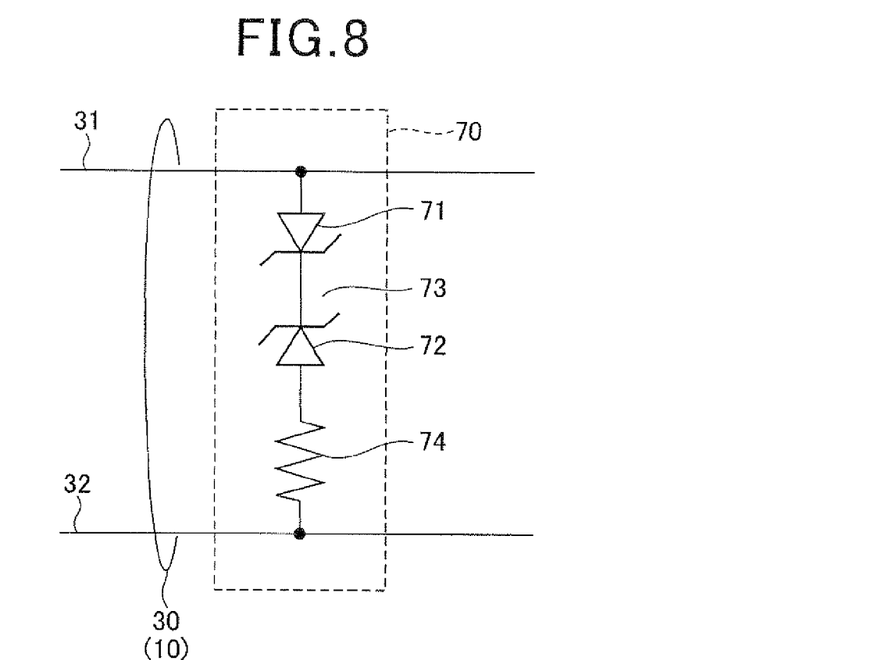
FIG. 8 is a diagram showing the structure of a reflection prevention circuit 70 of a communication system of a third embodiment of the invention.
Figure 9:
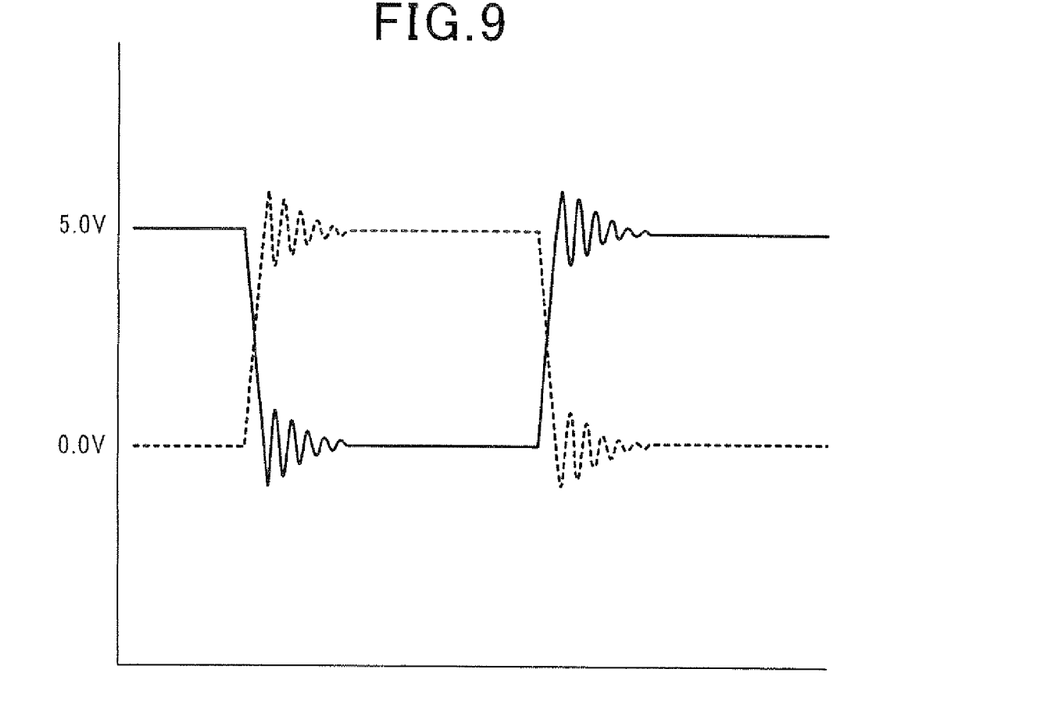
FIG. 9 is a diagram explaining advantages provided by the third embodiment of the invention.

The third embodiment differs from the first embodiment in that the third embodiment includes a reflection prevention circuit 70 shown in FIG. 8 instead of the reflection prevention circuit 50. As shown in FIG. 8, the reflection prevention circuit 70 includes a rectifier circuit 73 and a resistive element 74 connected in series between the communication lines 31 ad 32 constituting the branch line 30.

The rectifier circuit 73 is constituted of Zener diodes 71 and 72 connected in series in opposite directions. The impedance of the resistive element 74 is equal to the characteristic impedance of the bus 10.

Accordingly, in this embodiment, when the differential potential of the bus 10 is smaller than or equal to the sum of the forward voltage drop of the Zener diode 71 and the Zener voltage of the Zener diode 72, no current flows through the reflection prevention circuit 70. This applies also when the Zener diodes 71 and 72 are exchanged with each other. Incidentally, since the Zener voltage is large, the above sum can be made large easily. When the differential potential of the bus 10 is smaller than or equal to the above sum, since no current flows through the reflection prevention circuit 70, the transceiver 15 can stably receive signal at its buffer (see FIG. 3). On the other hand, when the differential potential of the bus 10 exceeds the above sum, a current flows through the reflection prevention circuit 70, and accordingly, the impedance seen from the bus 10 changes to the impedance of the resistive element 74. As a result, since impedance matching is achieved, a signal reflection can be suppressed.

The third embodiment described above is applicable to the case where the voltage difference between the differential signals used in the communication system 1 is large. As shown in FIG. 9, when the differential potential of the bus 10 higher than 5.0 V or lower than 0 V, a signal reflection can be suppressed since a currents flow through the reflection prevention circuit 80.

It is a matter of course that various modifications can be made to the above embodiments as described below. For example, the reflection prevention circuits 50, 60 and 70 may be provided on the branch line 30 outside the ECUs 101 to 104, or on the trunk line 20.

In the first embodiment, each of the diodes 51 to 51 may be a Zener diode. In the second embodiment, each of the diodes 61 and 62 may be a Zener diode.

In the first embodiment, the diode whose forward direction is from the communication line 31 to the communication line 32 or vice-versa may be three or more in number.

In the above embodiments, the impedance of the resistive element is equal to the characteristic impedance of the bus 10. However, since the diode itself has some slight impedance, the impedance of the resistive element may be set to such a value that the sum of this impedance and the impedance of the diode is equal to the characteristic impedance of the bus 10.

The above explained preferred embodiments are exemplary of the invention of the present application which is described solely by the claims appended below. It should be understood that modifications of the preferred embodiments may be made as would occur to one of skill in the art.

What is claimed is:

1. A communication system comprising:
   a trunk line constituted of first and second signal lines for transmitting differential signals;
   a plurality of branch lines each branching from the trunk line and connected with a node; and
   at least one reflection prevention circuit connected between the first and second signal lines;
   wherein the reflection prevention circuit includes a rectifier circuit configured to inhibit a current from flowing between the first and second signal lines when a voltage between the differential signals is smaller than or equal to a predetermined voltage, and allow a current to flow between the first and second signal lines when the voltage between the differential signals is larger than the predetermined voltage, and a resistive element connected in series to the rectifier circuit between the first and second signal lines.

2. The communication system according to claim 1, wherein the reflection prevention circuit is included in each of the nodes.

3. The communication system according to claim 1, wherein the rectifier circuit is constituted of first and second Zener diodes connected in series in opposite directions between the first and second signal lines.

4. The communication system according to claim 3, wherein the predetermined voltage is equivalent to the sum of a forward voltage drop of the first Zener diode and a Zener voltage of the second Zener diode.

5. The communication system according to claim 1, wherein the rectifier circuit includes a first diode whose forward direction is from the first signal line to the second signal line, and a second diode whose forward direction is from the second signal line to the first signal line, the first and second diodes being connected in parallel to each other.

6. The communication system according to claim 5, wherein the first and second diodes are constituted of the same number of diodes connected in series.

7. The communication system according to claim 5, wherein each of the first and second diodes is a Zener diode.

8. The communication system according to claim 5, wherein the predetermined voltage is equivalent to a forward voltage drop of the first diode or the second diode.

9. The communication system according to claim 5, wherein the impedance of the resistive element is substantially the same as the characteristic impedance of the first and second signal lines.

10. A node of a communication system including a trunk line constituted of first and second signal lines for transmitting differential signals, and a plurality of branch lines each branching from the trunk line, the node being connected to each of the branch lines and including a reflection prevention circuit, the node comprising:
    a rectifier circuit connected between the first and second signal lines and configured to inhibit a current from flowing between the first and second signal lines when a voltage between the differential signals is smaller than or equal to a predetermined voltage, and allow a current to flow between the first and second signal lines when the voltage between the differential signals is larger than the predetermined voltage; and
    a resistive element connected in series to the rectifier circuit between the first and second signal lines.

11. The node according to claim 10, wherein the rectifier circuit is constituted of first and second Zener diodes connected in series in opposite directions between the first and second signal lines.

12. The communication system according to claim 11, wherein the predetermined voltage is equivalent to the sum of a forward voltage drop of the first Zener diode and a Zener voltage of the second Zener diode.

13. The node according to claim 10, wherein the rectifier circuit includes a first diode whose forward direction is from the first signal line to the second signal line, and a second diode whose forward direction is from the second signal line to the first signal line, the first and second diodes being connected in parallel to each other.

14. The node according to claim 13, wherein the first and second diodes are constituted of the same number of diodes connected in series.

15. The node according to claim 13, wherein each of the first and second diodes is a Zener diode.

16. The node according to claim 13, wherein the predetermined voltage is equivalent to a forward voltage drop of the first diode or the second diode.

17. The node according to claim 13, wherein the impedance of the resistive element is substantially the same as the characteristic impedance of the first and second signal lines.

* * * * *